(12) United States Patent
Wan et al.

(10) Patent No.: US 12,445,154 B2
(45) Date of Patent: Oct. 14, 2025

(54) WIRED TRANSMITTER WITH OVERVOLTAGE PROTECTION

(71) Applicant: SigmaStar Technology Ltd., Fujian (CN)

(72) Inventors: Zhong-Yuan Wan, Shanghai (CN); Zhun Chen, Shanghai (CN); Jian-Feng Xue, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 92 days.

(21) Appl. No.: 18/529,371

(22) Filed: Dec. 5, 2023

(65) Prior Publication Data
US 2024/0214012 A1   Jun. 27, 2024

(30) Foreign Application Priority Data
Dec. 21, 2022 (CN) .......................... 202211650776.9

(51) Int. Cl.
*H03M 1/66* (2006.01)
*H03K 17/081* (2006.01)
*H03K 17/687* (2006.01)
*H04B 1/04* (2006.01)

(52) U.S. Cl.
CPC .......... *H04B 1/04* (2013.01); *H03K 17/08104* (2013.01); *H03K 17/687* (2013.01); *H03M 1/66* (2013.01); *H04B 2001/0408* (2013.01)

(58) Field of Classification Search
CPC .. H03F 1/26; H03F 3/45; H03F 3/183; H03K 3/012; H03K 3/037; H03K 17/16; H03K 17/081; H03K 17/687; H03K 17/08104; H03M 1/66; H03M 1/74; H04B 1/04; H04B 1/16
USPC ................ 326/14, 30, 80, 86, 102; 330/260; 375/219, 252, 295
See application file for complete search history.

(56) References Cited

U.S. PATENT DOCUMENTS

| | | | |
|---|---|---|---|
| 2002/0041193 A1* | 4/2002 | Tamura | H04L 5/1423 326/86 |
| 2007/0273444 A1* | 11/2007 | Bajdechi | H03F 3/45659 330/260 |
| 2022/0149863 A1* | 5/2022 | Ko | H04B 1/16 |

* cited by examiner

*Primary Examiner* — Shawkat M Ali
(74) *Attorney, Agent, or Firm* — Edell, Shapiro & Finnan, LLC (57) ABSTRACT

A wired transmitter includes a digital-to-analog converter (DAC) and a line driver. The DAC generates first output signals according to a digital code, wherein a first circuit in the DAC operates in a first voltage domain and a second circuit of the DAC operates in a second voltage domain, and an upper limit of the first voltage domain is lower than an upper limit of the second voltage domain. The line driver operates in the second voltage domain, and generates second output signals according to the first output signals. Each of the DAC and the line driver is implemented by transistors corresponding to the first voltage domain.

15 Claims, 5 Drawing Sheets

WIRED TRANSMITTER WITH OVERVOLTAGE PROTECTION

This application claims the benefit of China application Serial No. CN202211650776.9, filed on Dec. 21, 2022, the subject matter of which is incorporated herein by reference.

BACKGROUND OF THE INVENTION

Field of the Invention

The present application relates to a wired transmitter, and more particularly to a wired transmitter which provides an overvoltage protection and can be implemented by transistors having a relatively lower withstand voltage.

Description of the Related Art

Dimensions of transistors continue to reduce as manufacturing processes advance, such that the withstand voltage of transistors also keeps getting lower. However, in current applications, signal transmitters in Ethernet applications still need to transmit signals having higher levels. If a transmitter is directly implemented by transistors having a low withstand voltage, these transistors may be damaged due to withstanding overly large voltages, resulting in lowered reliability of the transmitter.

SUMMARY OF THE INVENTION

In some embodiments, it is an object of the present application to provide a transmitter, which provides an overvoltage protection and can be implemented by transistors having a lower withstand voltage, so as to improve the issues of the prior art.

In some embodiments, a wired transmitter includes a digital-to-analog converter (DAC) and a line driver. The DAC generates first output signals according to a digital code, wherein a first circuit in the DAC operates in a first voltage domain and a second circuit of the DAC operates in a second voltage domain, and an upper limit of the first voltage domain is lower than an upper limit of the second voltage domain. The line driver operates in the second voltage domain, and generates second output signals according to the first output signals. Each of the DAC and the line driver is implemented by transistors corresponding to the first voltage domain.

Features, implementations and effects of the present application are described in detail in preferred embodiments with the accompanying drawings below.

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
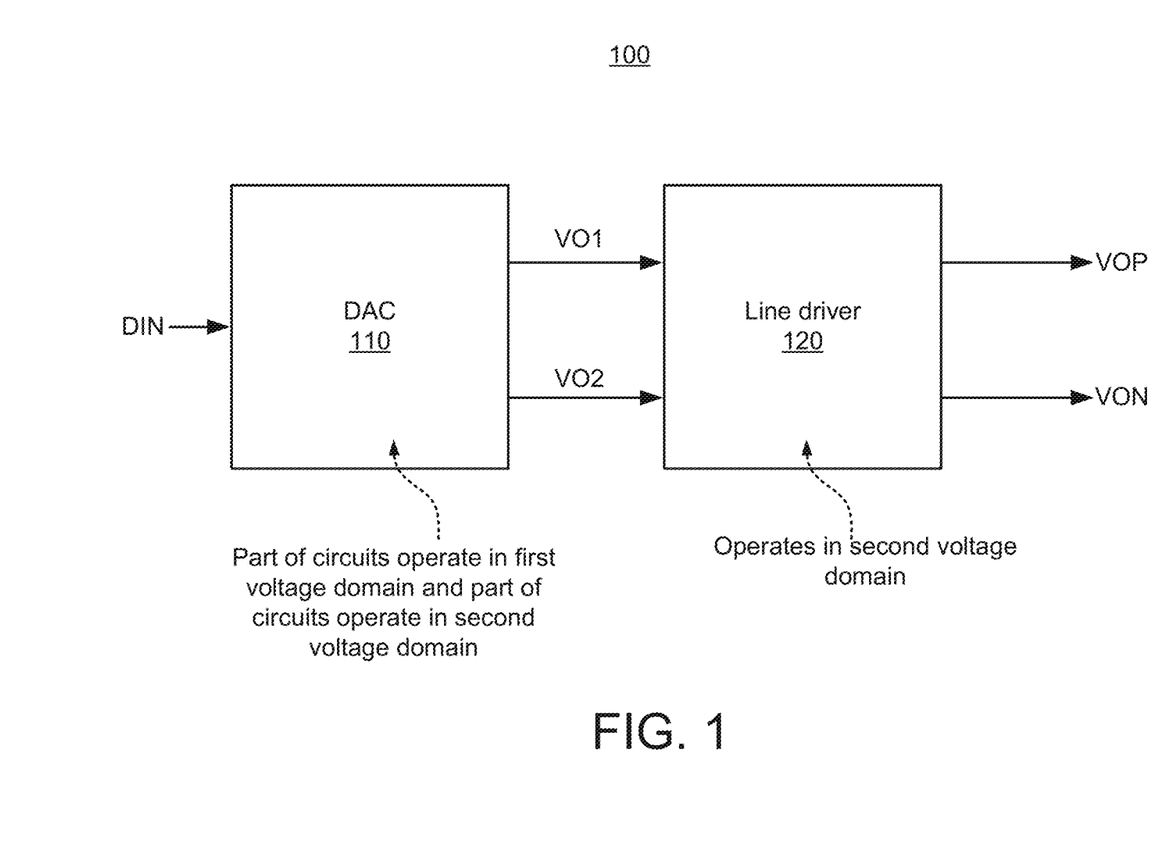
FIG. 1 is a schematic diagram of a wired transmitter according to some embodiments of the present application.

FIG. 1 shows a schematic diagram of a wired transmitter 100 according to some embodiments of the present application. In some embodiments, the wired transmitter 100 may be implemented by transistors having a low withstand voltage, and provides an overvoltage protection mechanism, so as to transmit signals having a higher level (for example, data signals transmitted over the Ethernet).

The wired transmitter 100 includes a digital-to-analog converter (DAC) 110 and a line driver 120. The DAC 110 generates multiple output signals VO1 and VO2 according to a digital code DIN. In some embodiments, part of circuits (to be referred to as a first circuit) in the DAC 100 operate in a first voltage domain and part of circuits (to be referred to as a second circuit) in the DAC 100 operate in a second voltage domain, and an upper limit of the first voltage domain is lower than an upper limit of the second voltage domain. For example, the upper limit of the first voltage domain is approximately 1.8 V, and a lower limit of the first voltage domain is approximately 0 V; the upper limit of the second voltage domain is approximately 3.3 V, and a lower limit of the second voltage domain is approximately 0 V. It should be noted that the above numerical values the upper and lower limits of the first and second voltage domains are merely examples, and the present application is not limited to these examples.

The line driver 120 operates in the second voltage domain, and generates multiple output signals VOP and VON according to the multiple output signals VO1 and VO2. In some embodiments, the multiple output signals VOP and VON may be data signals transmitted over the Ethernet. In some embodiments, each of the DAC 110 and the line driver 120 may be implemented by multiple transistors corresponding to the first voltage domain. In other words, the DAC 110 and the line driver 120 may be implemented by transistors having a lower withstand voltage (for example, having a maximum withstand voltage equal to the upper limit of the first voltage domain), and are operable in the second voltage domain having a higher upper limit.

Thus, transistors having lower withstand voltages may be used to implement the wired transmitter 100, which is then suitable for high-voltage applications.

In some embodiments, the wired transmitter 100 is selectively operable in a first mode (or referred to as a power-saving mode) and a second mode (or referred to as a normal mode or a transmission mode). In the first mode, the DAC 110 and the line driver 120 may be turned off and do not generate the multiple output signals VOP and VON. In the second mode, the DAC 110 and the line driver 120 operate normally and generate the multiple output signals VOP and VON. In the first mode and/or the second mode, an overvoltage protection mechanism in the DAC 110 and the liner driver 120 ensures that the above transistors having lower withstand voltages are not damaged, so as to enhance the overall durability and reliability. On the other hand, in the first mode, the overvoltage protection mechanism further reduces the leakage current in the DAC 110 and the line driver 120, so as to reduce the overall power consumption. Related configuration details are to be described with reference to the embodiments below.

Figure 2A:
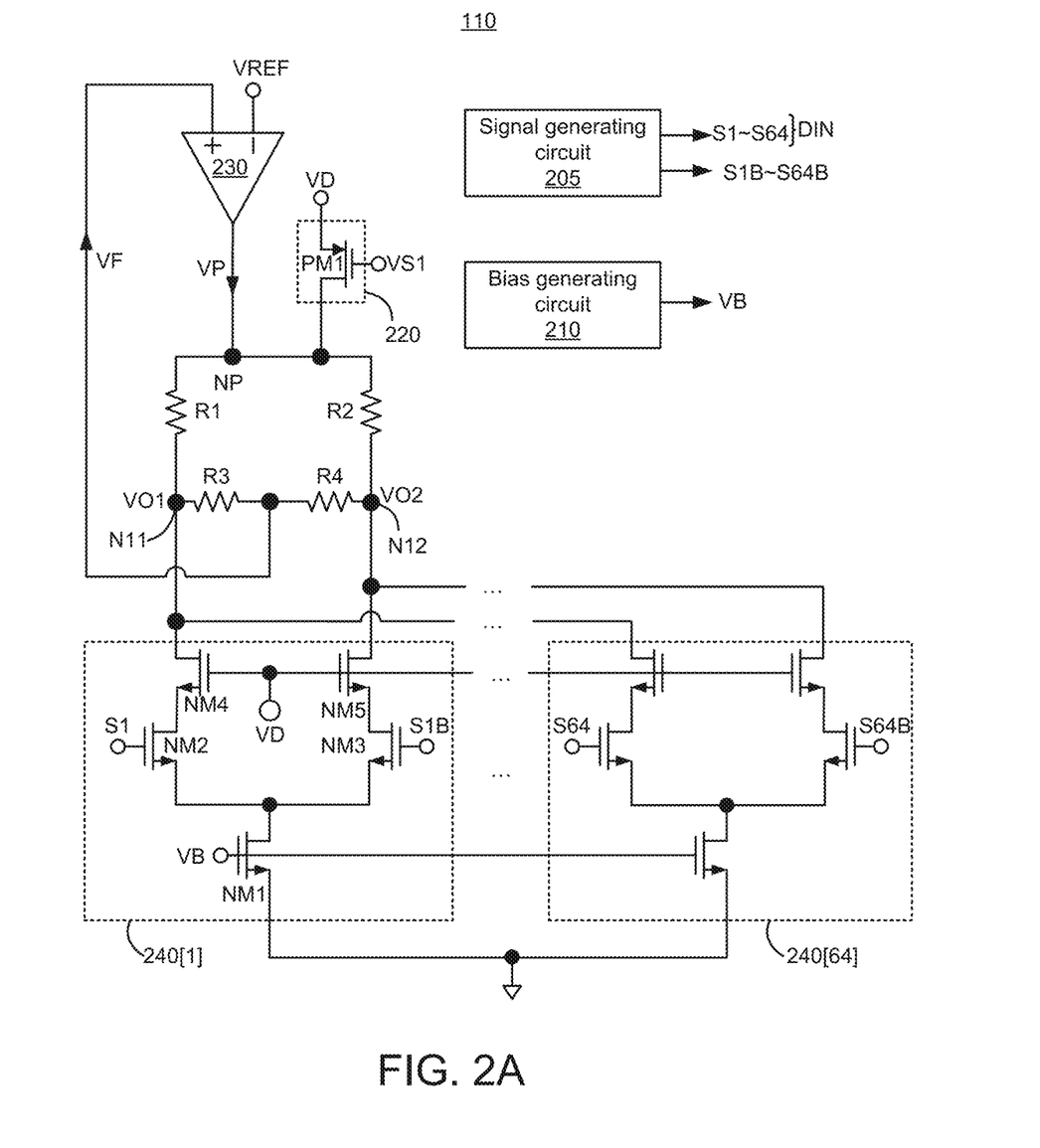
FIG. 2A is a schematic diagram of a digital-to-analog converter (DAC) in FIG. 1 according to some embodiments of the present application.

FIG. 2A shows a schematic diagram of the DAC 110 in FIG. 1 according to some embodiments of the present application. In some embodiments, the DAC 110 may be a current DAC. The DAC 110 includes a signal generating circuit 205, a bias generating circuit 210, a protection circuit 220, a buffer 230, multiple current source circuits 240[1] to 240[64], and multiple resistors R1 to R4. In some embodiments, the first circuit (that is, the circuits that operate in the first voltage domain) described above includes the signal generating circuit 205 and the bias generating circuit 210, and the second circuit (that is, the circuits that operate in the second voltage domain) described above includes the buffer 230, the multiple current source circuits 240[1] to 240[64] and the multiple resistors R1 to R4. In some embodiments, the second circuit transmits a predetermined voltage VD to a power supply node NP in the first mode so as to provide the DAC 110 with an overvoltage protection, wherein the DAC 110 is driven by the level of the power supply node NP in the second mode.

More specifically, the signal generating circuit 250 generates multiple bits S1 to S64 of the digital code DIN and generates multiple bits S1B to S64B, wherein a corresponding one of the multiple bits S1 to S64 is opposite to a corresponding one of the multiple bits S1B to S64B. For example, if the bit S1 has logic 1, the bit S1B has logic 0. Alternatively, if the bit S1 has logic 0, the bit S1B has logic 1. Similarly, when the bit S64 has logic 1 (or logic 0), the bit S64B has logic 0 (or logic 1). In some embodiments, the signal generating circuit 205 may include a coder/decoder (codec) and multiple inverters. The bias generating circuit 210 generates a bias voltage VB. In some embodiments, the bias generating circuit 210 may be, for example but not limited to, a low drop-out regulator (LDO). As described above, the signal generating circuit 205 and the bias generating circuit 210 may be the first circuit operating in the first voltage domain. In other words, the multiple bits S1 to S64, the upper limit of the level of each of the multiple bits S1B to S64B and the bias voltage VB is equal to the upper limit (for example, 1.8 V described above) of the first voltage domain.

The protection circuit 220 selectively transmits the predetermined voltage VD to the power supply node NP according to a switching voltage VS1, wherein the level of the predetermined voltage VD is equal to the upper limit of the first voltage domain. For example, the protection circuit 220 includes a P-type transistor PM1, which is selectively turned on according to the switching voltage VS1 so as to transmit the predetermined voltage VD to the power supply node NP. More specifically, a first terminal (for example, the source) of the P-type transistor PM1 receives the predetermined voltage VD, a second terminal (for example, the drain) of the P-type transistor PM1 is coupled to the power supply node NP, and a control terminal (for example, the gate) of the P-type transistor PM1 receives the switching voltage VS1.

In some embodiments, the switching voltage VS1 is from a level shifter (not shown), which outputs in the first mode the switching voltage VS1 having a first level (for example, equal to the lower limit of the second voltage domain and may be 0 V), and outputs in the second mode the switching voltage VS1 having a second level (for example, equal to the upper limit of the second voltage domain and may be 3.3 V). Thus, in an operation in the first mode, the P-type transistor PM1 is turned on in response to the switching voltage VS1 having the first level and transmits the predetermined voltage VD to the power supply node NP. Alternatively, in an operation in the second mode, the P-type transistor PM1 is turned off in response to the switching voltage VS1 having the second level, and does not transmit the predetermined voltage VD to the power supply node NP. In some embodiments, the predetermined voltage VD is from an LDO (not shown), which may generate the predetermined voltage VD having a level equal to the upper limit (for example, 1.8 V) of the first voltage domain.

The buffer 230 generates a power supply voltage VP according to the multiple output signals VO1 and VO2 and a reference voltage VREF, and transmits the power supply voltage VP to the power supply node NP. In some embodiments, the reference voltage VREF may be set to be one half of the upper limit of the second voltage domain. For example, as described above, the upper limit of the second voltage domain may be approximately 3.3 V, and the reference voltage VREF may then be approximately 1.65 (that is, 3.3/2) V. In some embodiments, the level of the power supply node NP is determined by the predetermined voltage VD in the first mode, and is determined by the power supply voltage VP in the second mode. For example, in the second mode, the P-type transistor PM1 is turned off and does not transmit the predetermined voltage VD to the power supply node NP. In this case, the level of the power supply node NP is equal to the power supply voltage VP. Alternatively, in the first mode, the buffer 230 is turned off (as to be described with reference to FIG. 2B below) and does not generate the power supply voltage VP, and the P-type transistor PM1 is turned on so as to transmit the predetermined voltage VD to the power supply node NP. In this case, the level of the power supply node NP is equal to the predetermined voltage VD.

The multiple current source circuits 240[1] to 24[64] are selectively turned on according to the digital code DIN, and are biased by the bias voltage VB, so as to generate the multiple output signals VO1 and VO2 through multiple nodes N11 and N12. More specifically, each of the multiple current source circuits 240[1] to 240[64] includes multiple N-type transistors, which have the same configuration in each of the current source circuits 240[1] to 240[64]. Taking the current source circuit 240[1] for example, the current source circuit 240[1] includes multiple N-type transistors NM1 to NM5. A first terminal (for example, the drain) of the N-type transistor NM1 is coupled to second terminals (for example, the sources) of the multiple N-type transistors NM2 and NM3, a second terminal (for example, the source) of the N-type transistor NM1 is coupled to ground, and a control terminal (for example, the gate) of the N-type transistor NM1 receives the bias voltage VB. A first terminal of the N-type transistor NM2 is coupled to a second terminal of the N-type transistor NM4, and a control terminal of the N-type transistor NM2 receives the bit S1. A first terminal of the N-type transistor NM3 is coupled to a second terminal of the N-type transistor NM5, and a control terminal of the N-type transistor NM3 receives the bit S1B. A first terminal of the N-type transistor NM4 is coupled to the node N11, a first terminal of the N-type transistor NM5 is coupled to a node N12, and control terminals of the multiple N-type transistors NM4 and NM5 receive the predetermined voltage VD.

With the configuration above, the N-type transistor NM1 can biased by the bias voltage VB so as to generate a current. The multiple N-type transistors NM2 and NM3 can be selectively turned on according to the bit S1 and the bit S1B, so as to determined to which one of the node N11 and the node N12 the current is to flow. The multiple N-type transistors NM4 and NM5 may be coupled between the multiple N-type transistors NM2 and NM3 and the multiple resistors R1 and R2, and are biased according to the bias voltage VD so as to provide the multiple N-type transistors NM1 to NM3 with an overvoltage protection. Similarly, the configuration and related operation details of the remaining current source circuits 240[2] to 240[64] of the multiple N-type transistors can be understood, and such repeated details are omitted herein. In other embodiments, the multiple current source circuits 240[1] to 240[64] may share the transistors NM4 and NM5. For example, only one set of transistor NM4 and transistor NM5 is configured in FIG. 2A, and the remaining transistors (for example, the multiple N-type transistors NM1 to NM3) in the multiple current source circuits 240[1] to 240[64] can all be connected to the set of transistor NM4 and transistor NM5.

The resistor R1 is coupled between the power supply node NP and the node N11, so as to convert the current flowing through the node N11 to the output signal VO1. The resistor R2 is coupled between the power supply node NP and the node N12, so as to convert the current flowing through the node N12 to the output signal VO2. The multiple resistors R3 and R4 are coupled between the node N11 and the node N12, so as to generate a feedback signal VF according to the multiple output signals VO1 and VO2, and to transmit the feedback signal VF to the buffer 230, for the buffer 230 to generate the power supply voltage VP according to the multiple output signals VO1 and VO2.

As described above, in an operation in the second mode, the wired transmitter 100 operates normally. In some embodiments, the levels of the multiple output signals VO1 and VO2 may be approximately 2.15 V as maximum, and be approximately 1.15 V as minimum. The multiple N-type transistors NM4 and NM5 are capable of withstanding voltage swings induced by the multiple output signals VO1 and VO2, so as to provide the multiple N-type transistors NM1 to NM3 with an overvoltage protection. In the first mode, the DAC 110 is turned off and does not generate the multiple output signals VOP and VON. In this case, the protection circuit 220 can be turned on to set the level of the power supply node NP to the predetermined level VD, such that the levels of the multiple output signals VOP and VON are equal to the predetermined voltage VD. Thus, the multiple current source circuits 240[1] to 240[64] can be provided with an overvoltage protection, thereby ensuring that overvoltage does not occur in the multiple N-type transistors NM1 to NM5.

On the other hand, in some embodiments, each of the multiple current source circuits 240[1] to 240[64] is implemented by multiple N-type transistors. Thus, the signal generating circuit 205 is enabled to operate in the first voltage domain having a lower upper limit, so as to reduce the complications in high-voltage applications implemented by transistors having a low withstand voltage.

Figure 2B:
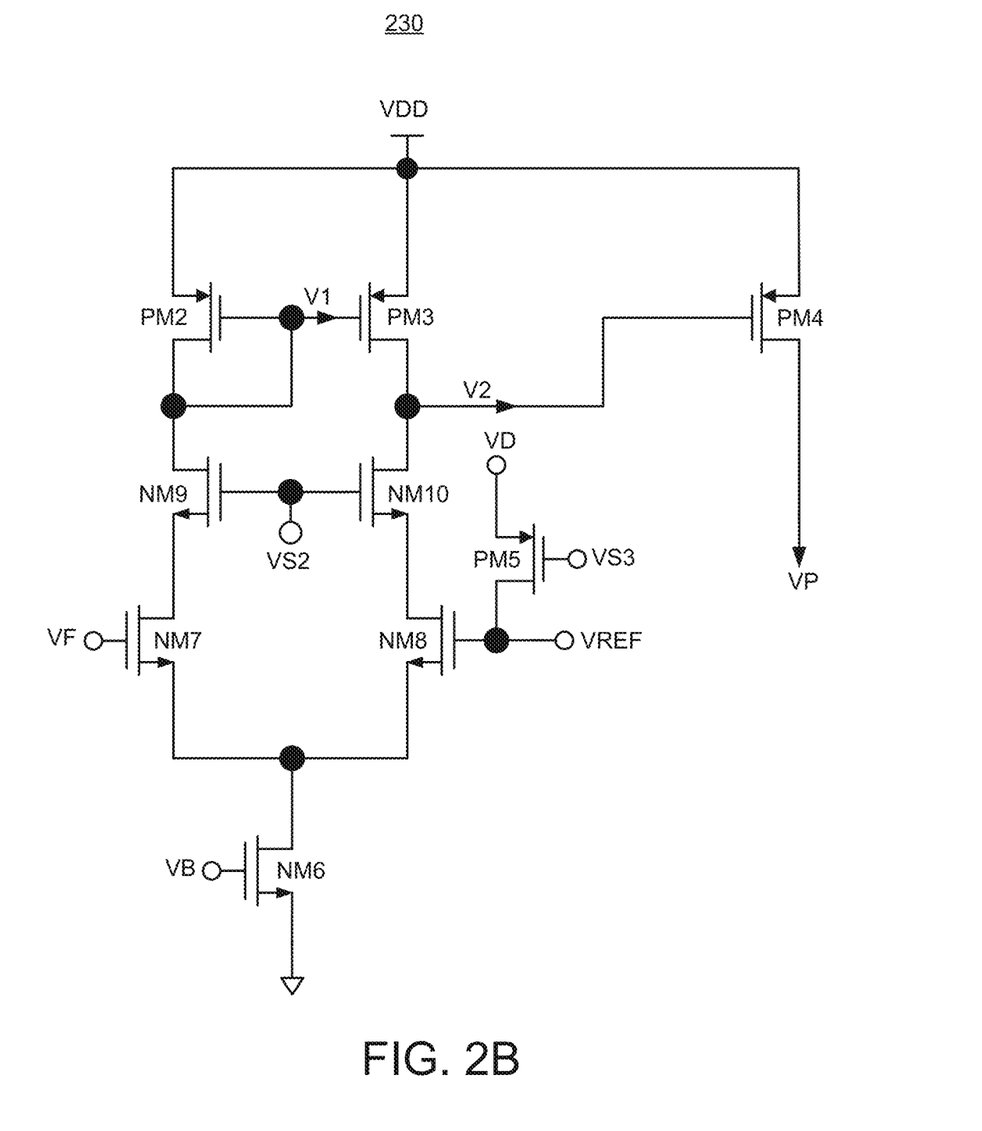
FIG. 2B is a schematic diagram of a buffer in FIG. 2A according to some embodiments of the present application.

FIG. 2B shows a schematic diagram of the buffer 230 in FIG. 2A according to some embodiments of the present application. In some embodiments, an input terminal (for example, the positive input terminal in FIG. 2A) in the buffer 230 switches to receive the predetermined voltage VD in the first mode, so as to provide the buffer 230 with an overvoltage protection.

More specifically, the buffer 230 includes multiple N-type transistors NM6 to NM10 and multiple P-type transistors PM2 to PM5. A first terminal of the N-type transistor NM6 is coupled to second terminals of the multiple N-type transistors NM7 and NM8, a second terminal of the N-type transistor NM6 is coupled to ground, and a control terminal of the N-type transistor NM6 receives the bias voltage VB. A first terminal of the N-type transistor NM7 is coupled to a second terminal of the N-type transistor NM9, and a control terminal of the N-type transistor NM7 (equivalent to a negative input terminal of the buffer 230 in FIG. 2A) is coupled to a node between the multiple resistors R3 and R4 in FIG. 2A so as to receive the feedback signal VF. A first terminal of the N-type transistor NM8 is coupled to a second terminal of the N-type transistor NM10, and a control terminal of the N-type transistor NM8 (equivalent to a positive input terminal of the buffer 230 in FIG. 2A) receives the reference voltage VREF. A first terminal of the N-type transistor NM9 is coupled to a second terminal of the P-type transistor PM2, a first terminal of the N-type transistor NM10 is coupled to a second terminal of the P-type transistor PM3, and control terminals of the multiple N-type transistors NM9 and NM10 receive a switching voltage VS2. In some embodiments, the switching voltage VS2 is from a level shifter (not shown), which outputs in the first mode the switching voltage VS2 having a level (for example, 1.8 V) equal to the upper limit of the first voltage domain, and outputs in the second mode the switching voltage VS2 having a level (for example, 3.3 V) equal to the upper limit of the second voltage domain.

First terminals of the multiple P-type transistors PM2 to PM4 receive a supply voltage VDD (which may be equal to the upper limit of the second voltage domain), and a second terminal and a control terminal of the P-type transistor PM2 are coupled to each other so as to form a diode-connected form and to generate a voltage V1. A control terminal of the P-type transistor PM3 receives the voltage V1, and a second terminal of the P-type transistor PM3 generates a voltage V2. A second terminal of the P-type transistor PM4 outputs the power supply voltage VP, and a control terminal of the P-type transistor PM4 receives the voltage V2. A first terminal of the P-type transistor PM5 receives the predetermined voltage VD, a second terminal of the P-type transistor PM5 is coupled to a control terminal of the N-type transistor NM8, and a control terminal of the P-type transistor PM5 receives a switching voltage VS3. In some embodiments, the switching voltage VS3 is from a level shifter (not shown), which outputs in the first mode the switching voltage VS3 having a level (for example, 0 V) equal to the lower limit of the first or second voltage domain, and outputs in the second mode the switching voltage VS3 having a level (for example, 1.8 V) equal to the upper limit of the first voltage domain.

With the configuration above, the N-type transistor NM6 can biased by the bias voltage VB so as to generate a current, thereby driving the multiple N-type transistors NM7 and NM8. As described above, in the second mode, the level of the reference voltage VREF is approximately 1.65 V, and the level of the switching signal VS2 is equal to the upper limit (for example, 3.3 V) of the second voltage domain. In this case, the multiple N-type transistors NM9 and NM10 can be turned on to withstand excess voltage, so as to ensure that overvoltage does not occur in any of the transistors in the buffer 230. Moreover, in the first mode, a node (not shown) that outputs the reference voltage VREF switches to a high-impedance state (equivalent to stopping outputting the reference voltage VREF) while leaving the level of the N-type transistor NM8 unaffected, the level of the switching signal VS2 switches to be equal to the upper limit (for example, 1.8 V) of the first voltage domain, and the P-type transistor PM5 is turned on to transmit the predetermined voltage VD to the N-type transistor NM8. In this case, the voltages on the control terminals of the multiple N-type transistors NM8, NM9 and NM10 are all equal to the upper limit of the first voltage domain, thereby ensuring that overvoltage does not occur in any of the transistors in the buffer 230. In other words, the multiple N-type transistors NM9 and NM10 and the P-type transistor PM5 can provide the buffer 230 with a corresponding overvoltage protection in different modes.

Figure 3A:
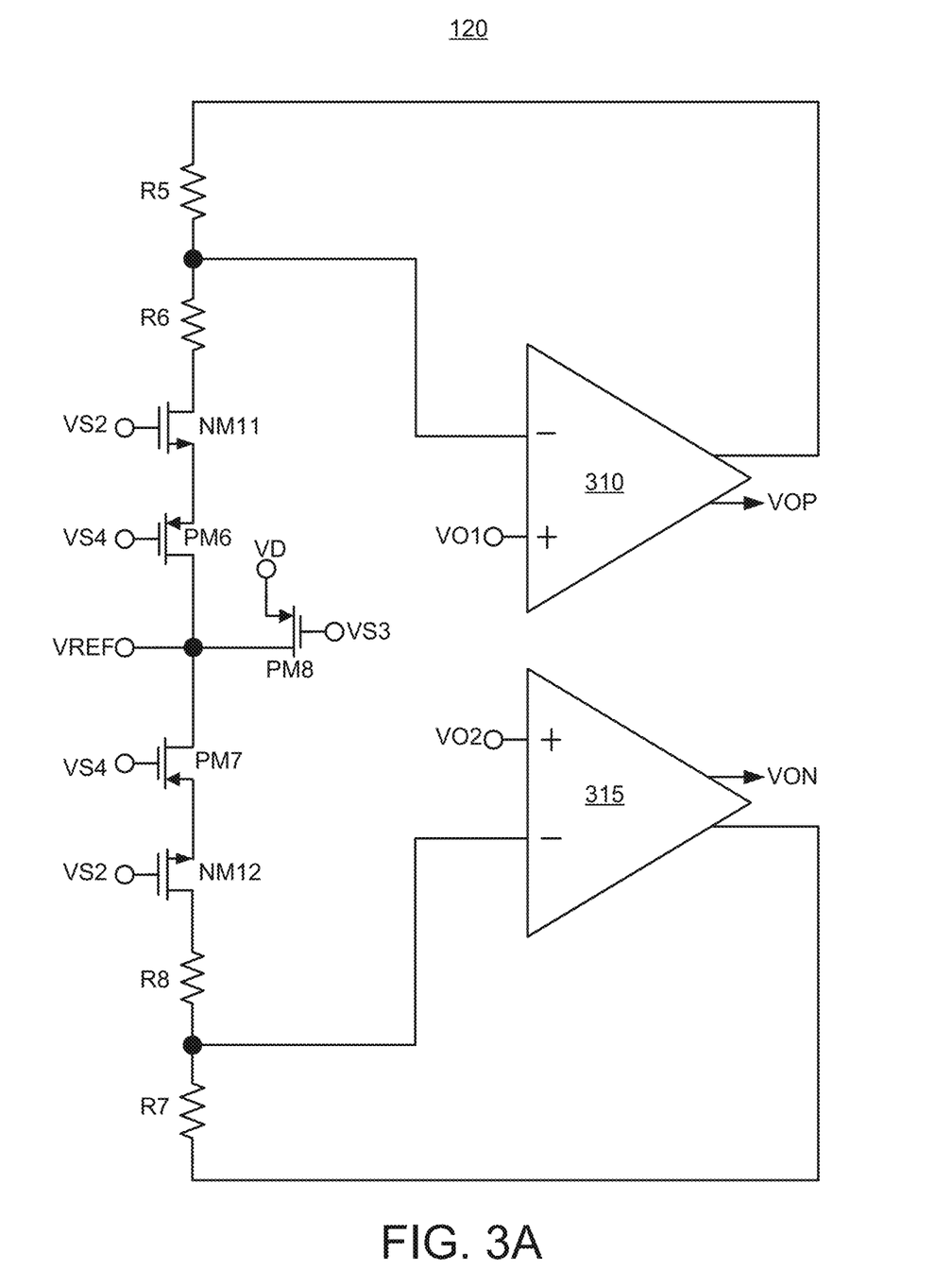
FIG. 3A is a schematic diagram of a line driver in FIG. 1 according to some embodiments of the present application.

FIG. 3A shows a schematic diagram of the line driver 120 in FIG. 1 according to some embodiments of the present application. The line driver 120 includes multiple amplifier circuits 310 and 315, multiple resistors R5 to R8, multiple N-type transistors NM11 and NM12, and multiple P-type transistors PM6 to PM8. The multiple amplifier circuits 310 and 315 generate the multiple output signals VOP and VON according to the multiple output signals VO1 and VO2.

A positive terminal of the amplifier circuit 310 receives the output signal VO1, and an output terminal of the amplifier circuit 310 generates the output signal VOP. A first terminal of the resistor R5 is coupled to the other output terminal of the amplifier circuit 310, and a second terminal of the resistor R5 and a first terminal of the resistor R6 are coupled to a negative input terminal of the amplifier circuit 310. A second terminal of the resistor R6 is coupled to a first terminal of the N-type transistor NM11. A second terminal of the N-type transistor NM11 is coupled to a first terminal of the P-type transistor PM6, and a control terminal of the N-type transistor NM11 receives the switching voltage VS2. A second terminal of the P-type transistor PM6 outputs the reference voltage VREF, and a control terminal of the P-type transistor PM6 receives a switching voltage VS4. In some embodiments, the switching voltage VS4 is from a level shifter (not shown), which outputs in the first mode the switching voltage VS4 having a level (for example, 0 V) equal to the lower limit of the first or second voltage domain, and outputs in the second mode the switching voltage VS4 having a level (for example, 1.8 V) equal to the upper limit of the first voltage domain. A first terminal of the P-type transistor PM8 receives the predetermined voltage VD, a second terminal of the P-type transistor PM8 receives the reference voltage VREF, and a control terminal of the P-type transistor PM8 receives a switching voltage VS3.

As described above, in the second mode, the level of the switching voltage VS2 is equal to the upper limit of the second voltage domain, the level of the switching voltage VS3 is equal to the lower limit of the first or second voltage domain, and the level of the switching voltage VS4 is equal to the upper voltage of the first voltage domain. In this case, the N-type transistor NM11 and the P-type transistor PM6 are both turned on, the P-type transistor PM8 is turned off, and overvoltage does not occur in any of the N-type transistor NM11 or the multiple P-type transistors PM6 and PM8. The N-type transistor NM11 and the P-type transistor PM6 can transmit the reference voltage VREF (which has a level of 1.65 V in the second mode) to the multiple resistors R5 and R6. Thus, the multiple resistors R5 and R6 can be used to set the gain of the amplifier circuit 310. For example, if the ratio between the resistance values of the resistors R5 and R6 is 6:4, the gain of the amplifier circuit 310 can be accordingly set to 2.5.

Alternatively, as described above, in the first mode, the level of the switching voltage VS2 is equal to the upper limit of the first voltage domain, and the levels of the multiple switching voltages VS3 and VS4 are equal to the lower limit of the first or second voltage domain. In this case, neither the N-type transistor NM11 and the P-type transistor PM6 is turned on, the P-type transistor PM8 is turned on, and overvoltage does not occur in any of the N-type transistor NM11 or the multiple P-type transistors PM6 and PM8. As described above, since the node outputting the reference voltage VREF is at high impedance (equivalent to stopping outputting the reference voltage VREF), the level of the second terminal of the P-type transistor PM6 is determined by the predetermined voltage VD coming from the P-type transistor PM8. Since the N-type transistor NM11 and the P-type transistor PM6 are turned off in the second mode, the output impedance (for example, the impedance of the output terminal coupled to the resistor R5) of the amplifier circuit 310 can be increased, thereby reducing the leakage current in circuits.

The related configuration and operation details of the amplifier circuit 315, the N-type transistor NM12, the P-type transistor PM7 and the multiple resistors R7 and R8 are the same as those of the amplifier circuit 310, the N-type transistor NM11, the P-type transistor PM6 and the multiple resistors R5 and R6, and such repeated details are omitted herein.

Figure 3B:
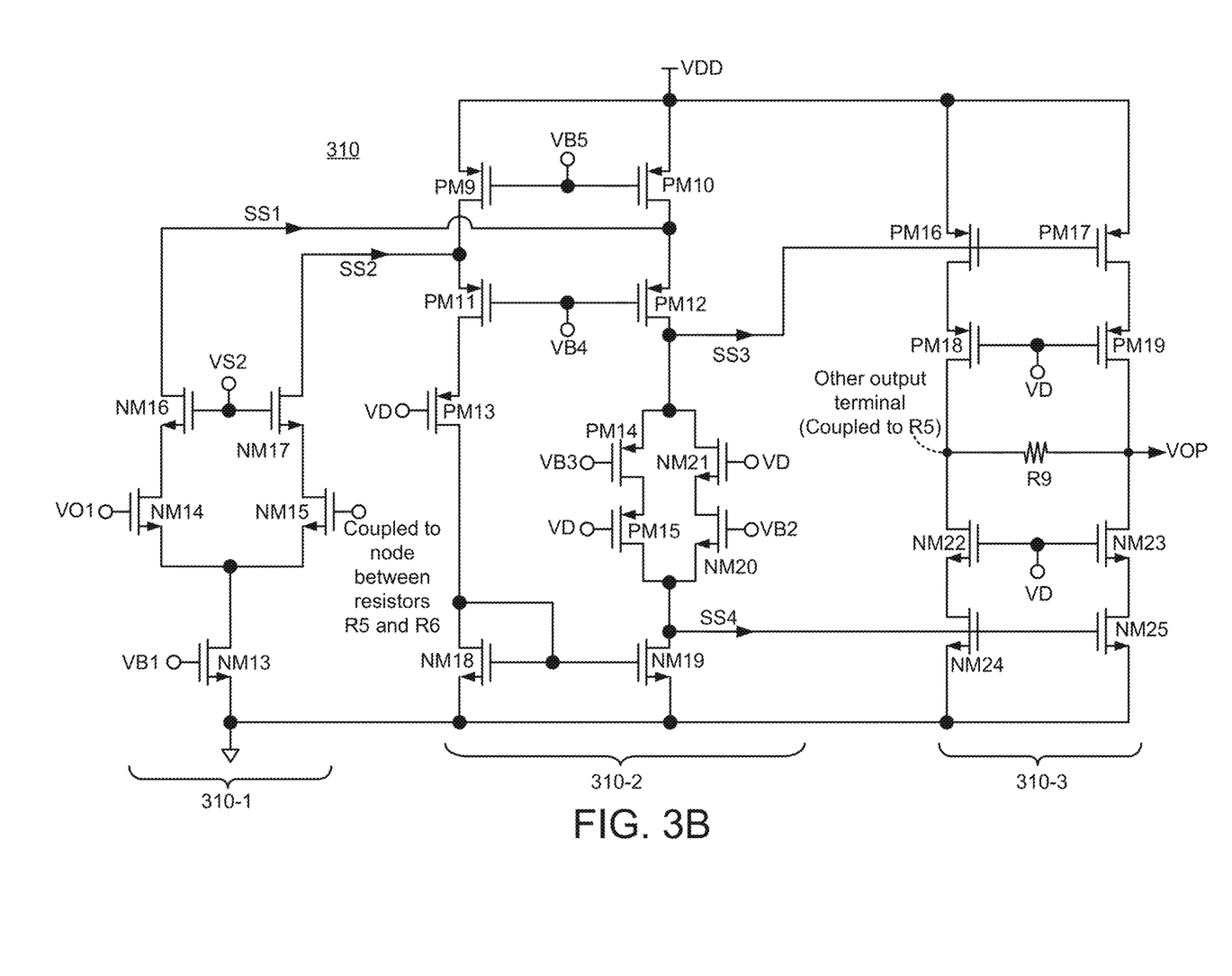
FIG. 3B is a schematic diagram of an amplifier circuit in FIG. 3A according to some embodiments of the present application.

FIG. 3B shows a schematic diagram of the amplifier circuit 310 in FIG. 3A according to some embodiments of the present application. In some embodiments, the circuit in FIG. 3B may also be used to implement the amplifier circuit 315 in FIG. 3A. In this example, the amplifier circuit 310 may be a fold cascode amplifier, so as to generate the output signal VOP having a high voltage swing. The amplifier circuit 310 includes a common source circuit 310-1, a common gate circuit 310-2 and a cascade circuit 310-3. The common source circuit 310-1 generates signals SS1 and SS2 according to the output signal VO1. The common gate circuit 310-2 generates signals SS3 and SS4 according to the signals SS1 and SS2. The cascade circuit 310-3 generates the output signal VOP according to the signals SS3 and SS4. In some embodiments, each of the common source circuit 310-1, the common gate circuit 310-2 and the cascade circuit 310-3 includes multiple transistors, which are for withstanding excessive voltage so as to provide other transistors in the corresponding circuit with a corresponding overvoltage protection.

More specifically, the common source circuit 310-1 includes multiple N-type transistors NM13 to NM17. A first terminal of the N-type transistor NM13 is coupled to second terminals of the multiple N-type transistors NM14 and NM15, a second terminal of the N-type transistor NM13 is coupled to ground, and a control terminal of the N-type transistor NM13 receives a bias voltage VB1. A first terminal of the N-type transistor NM14 is coupled to a second terminal of the N-type transistor NM16, and a control terminal of the N-type transistor NM14 receives the output signal VO1. A first terminal of the N-type transistor NM15 is coupled to a second terminal of the N-type transistor NM17, and a control terminal of the N-type transistor NM15 is coupled to a node between the multiple resistors R5 and R6 in FIG. 3A. First terminals of the multiple N-type transistor NM16 and NM17 generate the signals SS1 and SS2, respectively, and control terminals of the N-type transistor NM16 and NM17 receive the switching voltage VS2.

The common gate circuit 310-2 includes multiple N-type transistors NM18 to NM21 and multiple P-type transistors PM9 to PM15. First terminals of the P-type transistors PM9 and PM10 receive the supply voltage VDD, a second terminal of the P-type transistor PM9 receives the signal SS2 and is coupled to a first terminal of the P-type transistor P11, and control terminals of the multiple P-type transistors PM9 and PM10 receive a bias voltage VB5. A second terminal of the P-type transistor PM10 receives the signal SS1 and is coupled to a first terminal of the P-type transistor PM12. A second terminal of the P-type transistor PM11 is coupled to a first terminal of the P-type transistor PM13, and control terminals of the multiple P-type transistors PM11 and PM12 receive a bias voltage VB4. A second terminal of the P-type transistor PM12 is coupled to a first terminal of the P-type transistor PM14 and a first terminal of the N-type transistor NM21, and generates the signal SS3. A second terminal of the P-type transistor PM13 is coupled to a first terminal and a control terminal of the N-type transistor NM18, and a second terminal of the N-type transistor NM18 is coupled to ground. A second terminal of the P-type transistor PM14 is coupled to a first terminal of the P-type transistor PM15, and a control terminal of the P-type transistor PM14 receive a bias voltage VB3. A second terminal of the P-type transistor PM15 is coupled to a first terminal of the N-type transistor NM19, and a control terminal of the P-type transistor PM15 and a control terminal of the P-type transistor PM13 receive the predetermined voltage VD. A second terminal of the N-type transistor NM21 is coupled to a first terminal of the N-type transistor NM20, and a control terminal of the N-type transistor NM21 receives the predetermined voltage VD. A second terminal of the N-type transistor NM20 is coupled to a first terminal of the N-type transistor NM19 so as to generate the signal SS4, and a control terminal of the N-type transistor NM20 receives a bias voltage VB2. A control terminal of the N-type transistor NM19 is coupled to a control terminal of the N-type transistor NM18, and a second terminal of the N-type transistor NM19 is coupled to ground.

The cascade circuit 310-3 includes multiple N-type transistors NM22 to NM25, multiple P-type transistors PM16 and PM19, and a resistor R9. First terminals of the P-type transistors PM16 and P17 receive the supply voltage VDD, a second terminal of the P-type transistor PM16 is coupled to a first terminal of the P-type transistor PM18, a second terminal of the P-type transistor PM17 is coupled to a first terminal of the P-type transistor PM19, and control terminals of the multiple P-type transistors PM16 and PM17 receive the signal SS3. A second terminal of the P-type transistor PM18 is coupled to a first terminal of the resistor R9 and a first terminal of the N-type transistor NM22, a second terminal of the P-type transistor PM19 is coupled to a second terminal of the resistor R9 and a first terminal of the N-type transistor NM23, and control terminals of the multiple P-type transistors PM18 and PM19 receive the predetermined voltage VD. A second terminal of the resistor R9 is an output terminal (which generates the output signal VOP) of the amplifier circuit 310, and the first terminal of the resistor R9 is the other output terminal (which is coupled to the resistor R5 in FIG. 3A) of the amplifier circuit 310. A second terminal of the N-type transistor NM22 is coupled to a first terminal of the N-type transistor NM24, a second terminal of the N-type transistor NM23 is coupled to a first terminal of the N-type transistor NM25, and control terminals of the multiple N-type transistors NM22 and NM23 receive the predetermined voltage VD. Second terminals of the multiple N-type transistors NM24 and NM25 are coupled to ground, and control terminals of the multiple N-type transistors NM24 and NM25 receive the signal SS4.

As shown in FIG. 3B, in this example, the multiple output terminals of the buffer 310 are mutually coupled by the resistor R9 in between, wherein the resistance value of the resistor R9 is associated with the resistance values of the resistors R5 and R6 in FIG. 3A. In one example, assuming that the resistance value of a load (for example, the impedance of a transmission line) to be driven by the output terminal (that is, the second terminal of the resistor R9) that generates the output signal VOP is R (for example but not limited to, 50 ohms), the resistance value of the resistor R9 may be set to be n times of R, the resistance value of the resistor R5 may be set to be 0.6*n times of R, and the resistance value of the resistor R6 may be set to be 0.4*n times of R. In this case, the current flowing through the P-type transistor PM17, the P-type transistor PM19, the N-type transistor NM23 and the N-type transistor NM25 (that is, a current path associated with the output terminal that generates the output signal VOP in the cascade circuit 310-3) is n times of the current flowing through the P-type transistor PM17, the P-type transistor PM19, the N-type transistor NM23 and the N-type transistor NM25 (that is, the associated current path coupled to the output terminal in the cascade circuit 310-3). Thus, better impedance matching can be achieved. In some embodiments, the size of the P-type transistor PM17 may be n times of the size of the P-type transistor PM16, the size of the P-type transistor PM19 may be n times of the size of the P-type transistor PM18, the size of the N-type transistor NM23 may be n times of the size of the N-type transistor NM22, and the size of the N-type transistor NM25 may be n times of the size of the N-type transistor NM24. In some embodiments, n may be any value greater than 1, that is, the resistance value of the resistor R9 may be set to be multiple times of the resistance value of the load to be driven by the output signal VOP. In some embodiments, n may be 20; however, the present application is not limited to the example above.

On the other hand, the first terminal of the resistor R9 is coupled to the resistor R5 in FIG. 3A and is further coupled via the resistor R9 to the resistor R6, the N-type transistor NM11 and the P-type transistor PM6. As described above, in the first mode, the N-type transistor NM11 and the P-type transistor PM6 are turned off, such that the equivalent impedance formed on the first terminal of the resistor R9 increases, further increasing the output impedance. Thus, signals are prevented from returning from a load end (for example, a load to be driven by the output signal VOP) to the amplifier circuit 310, thereby reducing the leakage current of the amplifier circuit 310.

In the first mode, the level of the signal received by the control terminal of each of the multiple N-type transistors NM16, NM17, NM21, NM22 and NM23 and the multiple P-type transistors PM13, PM15, PM18 and PM19 is equal to the upper limit (for example, 1.8 V) of the first voltage domain. Accordingly, the multiple N-type transistors NM16, NM17, NM21, NM22 and NM23 and the multiple P-type transistors PM13, PM15, PM18 and PM19 can withstand excessive voltage, so as to provide the common source circuit 310-1, the common gate circuit 310-2 and the cascade circuit 310-3 with a corresponding overvoltage protection. Thus, it is ensured that overvoltage does not occur in the other transistors in the common source circuit 310-1, the common gate circuit 310-2 and the cascade circuit 310-3.

It should be noted that the above numerical values of the voltages, current ratios and/or size ratios are merely examples, and the present application is not limited to these examples. It should be understood that, in other applications, the DAC 110 and the line driver 120 in FIG. 1 can also by other types of circuits. Therefore, the present application is not limited to the circuit configurations shown in FIG. 2B or FIG. 3B.

In conclusion, the wired transmitter according to some embodiments of the present application provides multiple overvoltage protection mechanisms, and accordingly protects the multiple transistors in the circuits in different modes (power saving mode or transmission mode). Thus, transistors having withstand voltages of newer processes may be used to implement the wired transmitter. Moreover, in the power-saving mode, part of the overvoltage mechanisms can increase the output impedance, thereby improving the issue of leakage current.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A wired transmitter, comprising:
   a digital-to-analog converter (DAC) configured to generate a plurality of first output signals according to a digital code, wherein a first circuit in the DAC operates in a first voltage domain and a second circuit of the DAC operates in a second voltage domain, and an upper limit of the first voltage domain is lower than an upper limit of the second voltage domain; and
   a line driver configured to operate in the second voltage domain, and generate a plurality of second output signals according to the first output signals, wherein each of the DAC and the line driver is implemented by a plurality of transistors corresponding to the first voltage domain,
   wherein the second circuit transmits a predetermined voltage to a power supply node in a first mode to provide the DAC with an overvoltage protection, and the DAC is driven by a level of the power supply node in a second mode.

2. The wired transmitter according to claim 1, wherein the predetermined voltage is equal to the upper limit of the first voltage domain.

3. The wired transmitter according to claim 1, wherein the second circuit comprises:
   a first protection circuit configured to selectively transmit the predetermined voltage to the power supply node according to a first switching voltage;
   a buffer configured to generate a power supply voltage according to the first output signals and a reference voltage, and configured to transmit the power supply voltage to the power supply node, wherein a level of the power supply node is determined by the predetermined voltage in the first mode and is determined by the power supply voltage in the second mode;
   a plurality of current source circuits configured to selectively turn on according to the digital code and biased by a bias voltage, and configured to generate the first output signals via a plurality of first nodes;
   a plurality of first resistors, coupled between the first nodes and the power supply node; and
   a plurality of second resistors, coupled between the first nodes.

4. The wired transmitter according to claim 3, wherein a level of the first switching voltage is equal to a lower limit of the second voltage domain in the first mode, and is equal to the upper limit of the second voltage domain in the second mode.

5. The wired transmitter according to claim 3, wherein each of the current source circuits comprises:
   a first transistor, biased by the bias voltage to generate a current;
   a plurality of second transistors, selectively turned on according to a first bit and a second bit of the digital code to determine to which one of the first nodes the current is to flow, wherein a value of the first bit is opposite to a value of the second bit; and
   a plurality of third transistors, coupled between the second transistors and the first resistors, and biased by the bias voltage to provide the first transistor and the second transistors with the overvoltage protection.

6. The wired transmitter according to claim 3, wherein an input terminal of the buffer that receives the reference voltage receives the predetermined voltage in the first mode, to provide the buffer with the overvoltage protection.

7. The wired transmitter according to claim 3, wherein the buffer comprises:
   a first transistor, biased by a bias voltage to generate a current;
   a second transistor, coupled to a node between the second resistors;
   a third transistor, coupled to the first transistor, and biased by the reference voltage;
   a fourth transistor, connected as a diode form, and configured to generate a first voltage;
   a fifth transistor, biased by the first voltage, and configured to generate a second voltage;
   a plurality of sixth transistors, individually coupled between the second transistor and the fourth transistor and coupled between the third transistor and the fifth transistor, and biased by a second switching voltage;
   a seventh transistor configured to generate the power supply voltage according to the second voltage; and
   an eighth transistor configure to bias and selectively turn on according to a third switching voltage to transmit the predetermined voltage to the third transistor in the first mode, to provide the overvoltage protection.

8. The wired transmitter according to claim 7, wherein a level of the second switching voltage is equal to the upper limit of the first voltage domain in the first mode, and is equal to the upper limit of the second voltage domain in the second mode.

9. The wired transmitter according to claim 7, wherein a level of the third switching voltage is equal to a lower limit of the first voltage domain in the first mode, and is equal to a lower limit of the first voltage domain in the second mode.

10. The wired transmitter according to claim 1, wherein the line driver comprises:

a plurality of amplifier circuits configured to generate the second output signals according to the first output signals;

a plurality of first resistors configured to set a gain of a first amplifier circuit of the amplifier circuits;

a plurality of second resistors configured to set a gain of a second amplifier circuit of the amplifier circuits;

a plurality of first transistors, configured to be turned off in the first mode according to a plurality of first switching voltages to increase an output impedance of the first amplifier circuit, or to be turned on in the second mode to transmit a reference voltage to the first resistors;

a plurality of second transistors, configured to be turned off in the first mode according to the first switching voltages to increase an output impedance of the second amplifier circuit, or to be turned on in the second mode to transmit the reference voltage to the second resistors; and a third transistor, configured to be selectively turned on according to a second switching voltage to transmit the predetermined voltage to the first transistors and the second transistors.

11. The wired transmitter according to claim 10, wherein the first transistors comprise:

an N-type transistor, configured to be selectively turned on according to a first voltage of the first switching voltages; and a P-type transistor, configured to be selectively turned on according to a second voltage of the first switching voltages.

12. The wired transmitter according to claim 11, wherein a level of the second voltage is equal to a lower limit of the first voltage domain in the first mode, and is equal to the upper limit of the first voltage domain in the second mode.

13. The wired transmitter according to claim 10, wherein a plurality of output terminals of the first amplifier circuit are mutually coupled via a third resistor, and a resistance value of each of the first resistors is associated with a resistance value of the third resistor.

14. The wired transmitter according to claim 13, wherein when a load to be driven by one, of the second output signals, output by the first amplifier circuit has a first resistance value, the resistance value of the third resistor is plural times of the first resistance value.

15. The wired transmitter according to claim 10, wherein the first amplifier circuit comprises:

a common source circuit configured to generate a plurality of first signals according to one of the first output signals;

a common gate circuit configured to generate a plurality of second signals according to the first signals; and a cascade circuit configured to generate one of the second output signals according to the second signals, wherein each of the common source circuit, the common gate circuit and the cascade circuit comprises a plurality of transistors which are configured to provide the overvoltage protection.

* * * * *